(12) United States Patent
Ke

(10) Patent No.: US 8,018,519 B2
(45) Date of Patent: Sep. 13, 2011

(54) CAMERA MODULE AND METHOD FOR PERSONALIZING ON-SCREEN DISPLAY INTERFACE

(75) Inventor: Jie-Yan Ke, Guangdong (CN)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 532 days.

(21) Appl. No.: 12/118,951

(22) Filed: May 12, 2008

(65) Prior Publication Data

US 2009/0096892 A1      Apr. 16, 2009

(30) Foreign Application Priority Data

Oct. 11, 2007   (CN) .......................... 2007 1 0202025

(51) Int. Cl.
*H04N 5/222* (2006.01)
(52) U.S. Cl. ................................. 348/333.02
(58) Field of Classification Search ........................ None
See application file for complete search history.

(56) References Cited

U.S. PATENT DOCUMENTS

| 7,304,685 | B2 | 12/2007 | Park et al. | |
|---|---|---|---|---|
| 2001/0055038 | A1* | 12/2001 | Kim | 345/810 |
| 2005/0076310 | A1* | 4/2005 | Tada | 715/838 |
| 2005/0216862 | A1* | 9/2005 | Shinohara et al. | 715/825 |
| 2007/0118808 | A1* | 5/2007 | Chen et al. | 715/764 |
| 2007/0120856 | A1* | 5/2007 | De Ruyter et al. | 345/440 |
| 2007/0162298 | A1* | 7/2007 | Melton et al. | 705/1 |
| 2007/0220441 | A1* | 9/2007 | Melton et al. | 715/781 |
| 2008/0046840 | A1* | 2/2008 | Melton et al. | 715/825 |

FOREIGN PATENT DOCUMENTS

| CN | 1329451 | A | 1/2002 |
|---|---|---|---|
| CN | 1506746 | A | 6/2004 |
| CN | 1632734 | A | 6/2005 |
| CN | 1773875 | A | 5/2006 |
| TW | 200615673 | A | 5/2006 |
| TW | 200721058 | A | 6/2007 |

* cited by examiner

*Primary Examiner* — David Ometz
*Assistant Examiner* — Angel L Garces-Rivera
(74) *Attorney, Agent, or Firm* — Altis Law Group, Inc.

(57) ABSTRACT

A camera module capable of allowing personalization of an On-Screen Display (OSD) interface is provided. The camera module includes: a transmitting unit configured for transmitting icons to be used in an OSD interface to the camera module wirelessly or over wire, and saving the icons in a storage of the camera module; a mode selecting unit configured for selecting an OSD personalization mode; a reading unit configured for reading the transmitted icons from the storage of the camera module; a setting unit configured for setting the display size of the OSD interface and coordinates of each icon on a screen of an electronic device installed with the camera module to generate a personalized OSD interface. A related method for personalizing an OSD is also provided.

5 Claims, 2 Drawing Sheets

CAMERA MODULE AND METHOD FOR PERSONALIZING ON-SCREEN DISPLAY INTERFACE

BACKGROUND

1. Technical Field

The present invention relates to a camera module and a method for personalizing an On-Screen Display interface.

2. Description of Related Art

On-Screen Displays (OSDs) display information to help operate digital camera. Some OSDs have been installed in digital cameras and other OSD-enabled devices with image capturing function. In general, an OSD interface includes different kinds of icons. Each icon is related to a designated function. For example, the function can be adjusting volume, contrast, brightness, vertical position, horizontal position, and the like. OSDs can provide visual helps for users of OSD-enabled devices to make adjustments of device settings. However, a conventional OSD interface does not provide personalization capability for OSD interfaces for users of digital cameras and other OSD-enabled devices.

What is needed, therefore, is a camera module and a method for personalizing an OSD interface.

SUMMARY

This disclosure provides an exemplary embodiment for a camera module capable of allowing a user to personalize an OSD interface for interacting with the camera module. The camera module includes: a transmitting unit, a mode selecting unit, a reading unit and a setting unit. The transmitting unit is configured for transmitting icons to be used in an OSD interface to the camera module wirelessly or over wire, and saving the icons in a storage of the camera module. The mode selecting unit is configured for a user to select an OSD personalization mode. The reading unit is configured for reading the transmitted icons from the storage of the camera module. The setting unit is configured to allow a user to construct OSD with different parameters and therefore to render a new OSD interface.

Other advantages and novel features of the present invention will become more apparent from the following detailed description of exemplary embodiments when taken in conjunction with the accompanying drawings.

DETAILED DESCRIPTION OF THE EMBODIMENT

Figure 1:
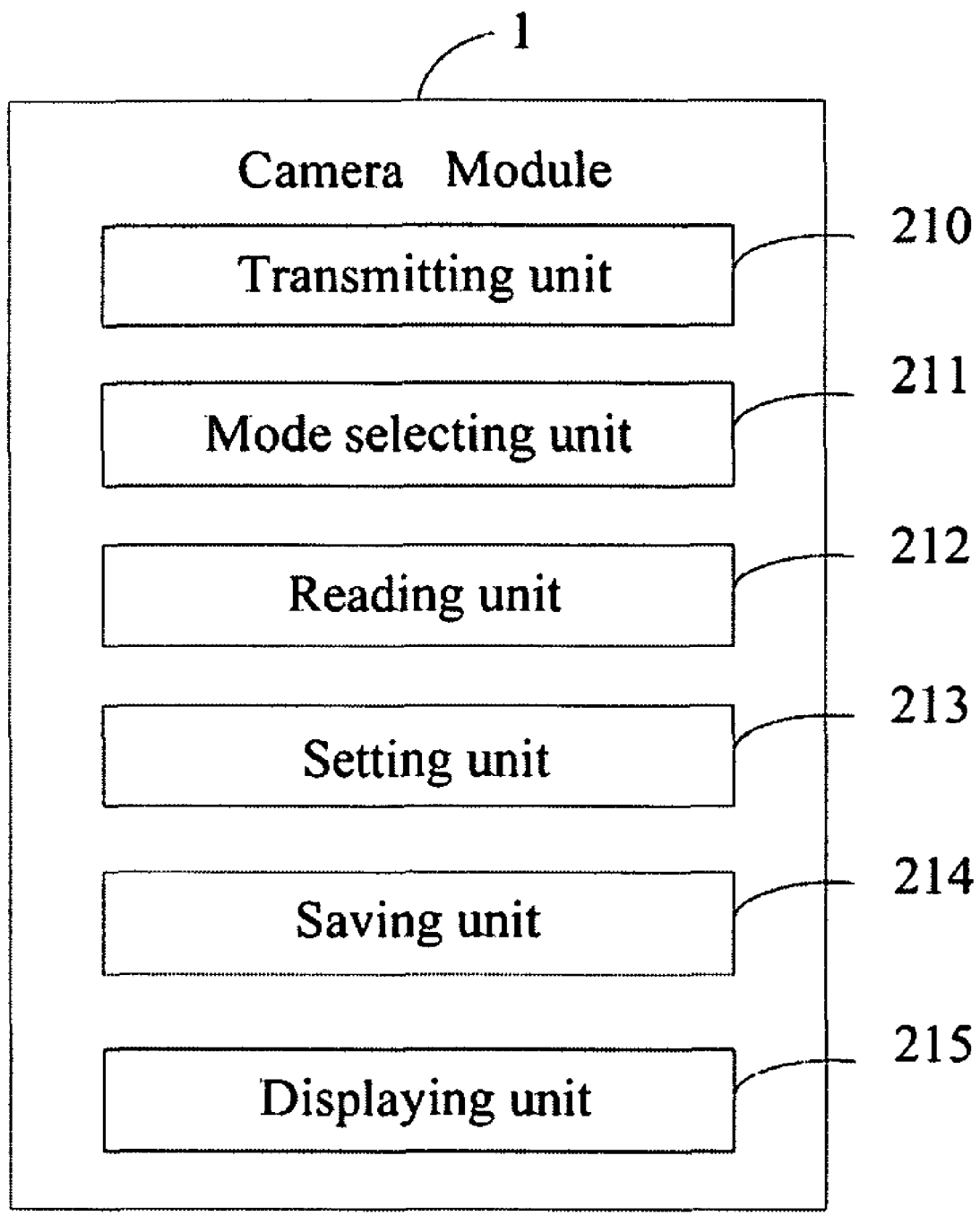
FIG. 1 is a block diagram of function units of a camera module capable of allowing personalization of an OSD interface in accordance with an exemplary embodiment.

FIG. 1 is a block diagram of function units of a camera module 1 capable of allowing personalization of OSD interface in accordance with an exemplary embodiment. The camera module 1 may be installed in a digital camera, a mobile telephone, or any other digital device with image capturing function. In the exemplary embodiment, the camera module 1 is installed in a digital camera (not shown). The digital camera can be connected to the Internet or a data-storage device (such as a computer) wirelessly or over wire.

The camera module 1 herein includes a number of function units, i.e., a transmitting unit 210, a mode selecting unit 211, a reading unit 212, a setting unit 213, a saving unit 214, and a displaying unit 215.

The transmitting unit 210 is configured for transmitting icons to be used in the OSD interface to the camera module 1 wirelessly or over wire, and saving the icons in a storage installed in the camera module 1. The storage can be a flash, a random access memory (RAM) device, a micro hard drive or any other medium that can store data. In this embodiment, the icons are selected and downloaded by a user from one or more Internet websites. Many websites, such as baidu.com and google.com etc, may provide a number of web pages that contain different kinds of icons for users to view and download.

The mode unit 211 is configured for a user to select an OSD personalization mode. The program of this mode provides a way for setting an icon to represent a function. An icon can represent anything that the user want it to: any macro command, process, or any indicators.

The reading unit 212 is configured for reading the transmitted icons from the storage.

The setting unit 213 is configured for setting a display size of the OSD interface and the coordinates of each icon on the screen of a digital camera to generate a new OSD interface. The maximum size of the OSD interface cannot exceed the size of the screen of the digital camera. The coordinates of each icon can be set to any position on the screen. Each icon may be used to indicate a status of the camera module 1. For example, the user can set an icon to appear when an optical zoom function is currently accessed.

The saving unit 214 is configured for naming and saving the personalized OSD interfaces in the camera module 1.

The displaying unit 215 is mainly configured for displaying the personalized OSD interface on the screen of a digital camera based on the selected name of the saved interface. For example, if the name of the personalized OSD interface is "A", the screen displays the personalized OSD interface when user selects the name "A".

Figure 2:
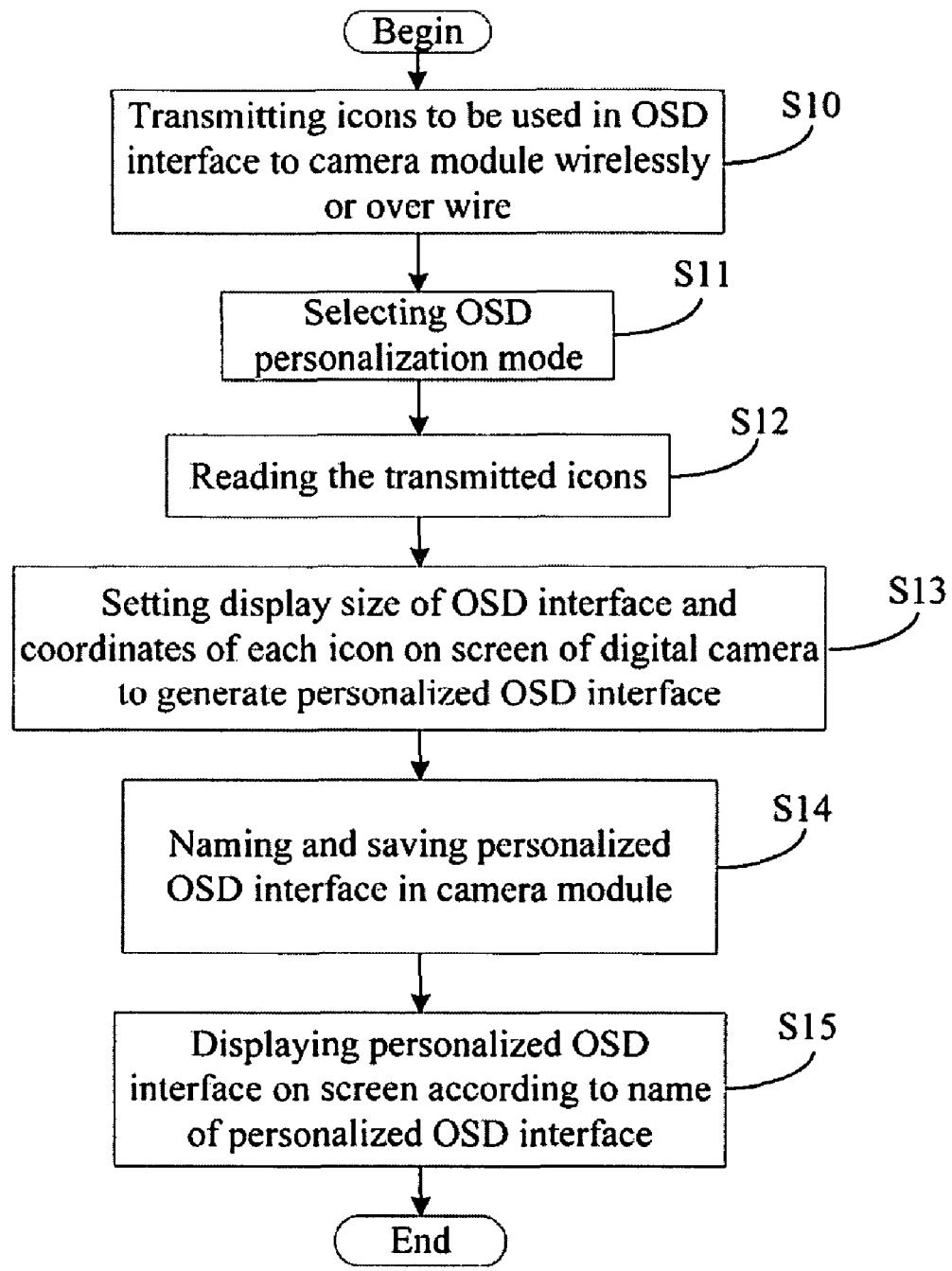
FIG. 2 is a flowchart illustrating a method for personalizing an OSD interface in accordance with the exemplary embodiment.

FIG. 2 is a flowchart illustrating a method for personalizing an OSD interface in a camera module in accordance with the exemplary embodiment.

In step S10, the transmitting unit 210 transmits icons used in the OSD interface to the camera module 1 wirelessly or over wire, and names and saves the icons in a storage installed in the camera module 1. The storage can be a flash, a RAM device, a micro hard drive or any other medium that can store data. In this embodiment, the icons are selected and downloaded by a user from one or more websites.

In step S11, the user selects an OSD personalization mode through the mode selecting unit 211. The program of this mode provides a way for setting an icon to represent a function. An icon can represent anything that the user want it to: any macro command, process, or any indicators.

In step S12, the reading unit 212 reads the transmitted icons from the storage.

In step S13, the setting unit 213 sets the display size of the OSD interface and the coordinates of each icon on a screen of a digital camera to generate a personalized OSD interface. The maximum size of the OSD interface cannot exceed the size of the screen of the digital camera. The coordinates of each icon can be set to any position on the screen. Each icon indicates a status of the camera module 1. For example, the user can set an icon corresponding to an optical zoom function. If the icon is selected and displayed on the screen, it indicates that the optical zoom function of the camera module 1 is currently accessed.

In step S14, the saving unit 214 saves the personalized OSD interface in the camera module 1 with a unique name.

In step S15, the displaying unit 215 displays a personalized OSD interface on the screen of the digital camera based on the selected name of the saved interface. For example, if the name of the personalized OSD interface is "A", the screen displays the personalized OSD interface when the user selects the name "A".

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A camera module capable of allowing personalization of an On-Screen Display (OSD) interface, the camera module comprising:
    a transmitting unit configured for transmitting icons to be used in an OSD interface to the camera module by a wireless or wired connection, and saving the icons in a storage of the camera module;
    a mode selecting unit configured for selecting an OSD personalization mode;
    a reading unit configured for reading the transmitted icons from the storage of the camera module; and
    a setting unit configured for setting a display size of the OSD interface and coordinates of each icon on a screen of an electronic device installed with the camera module to generate a personalized OSD interface, wherein coordinates of each of the icons on the screen of the electronic device are not bounded by the display size of the OSD interface.

2. The camera module as described in claim 1, wherein the electronic device is a digital camera or a camera phone.

3. The camera module as described in claim 1, further comprising:
    a saving unit configured for saving a personalized OSD interface in the camera module with a unique name; and
    a displaying unit configured for displaying the personalized OSD interface on the screen of the electronic device according to the name of the personalized OSD interface saved by said saving unit.

4. A method for individualizing an On-Screen Display (OSD) interface in a camera module, the method comprising:
    transmitting icons to be used in an OSD interface to the camera module by a wireless or wired connection, and saving the icons in a storage of the camera module;
    selecting an OSD personalization mode;
    reading the transmitted icons from the storage of the camera module; and
    setting a display size of the OSD interface and the coordinates of each icon on a screen of an electronic device installed with the camera module to generate a personalized OSD interface, wherein coordinates of each of the icons on the screen of the electronic device are not bounded by the display size of the OSD interface.

5. The method as described in claim 4, further comprising:
    saving the personalized OSD interface in the camera module with a unique name; and
    displaying the new OSD interface on the screen of the electronic device according to the name of the personalized OSD interface.

\* \* \* \* \*